US007890092B2

(12) United States Patent
Bruno et al.

(10) Patent No.: US 7,890,092 B2
(45) Date of Patent: Feb. 15, 2011

(54) METHOD OF OPTIMISING WEB PAGE ACCESS IN WIRELESS NETWORKS

(75) Inventors: Giorgio Bruno, Turin (IT); Davide Mamino, Turin (IT)

(73) Assignee: Telecom Italia S.p.A., Milan (IT)

( * ) Notice: Subject to any disclaimer, the term of this patent is extended or adjusted under 35 U.S.C. 154(b) by 873 days.

(21) Appl. No.: 11/794,166

(22) PCT Filed: Dec. 24, 2004

(86) PCT No.: PCT/EP2004/014716

§ 371 (c)(1),
(2), (4) Date: Jun. 25, 2007

(87) PCT Pub. No.: WO2006/066613

PCT Pub. Date: Jun. 29, 2006

(65) Prior Publication Data

US 2008/0018658 A1    Jan. 24, 2008

(51) Int. Cl.
G06F 3/14 (2006.01)
(52) U.S. Cl. ...................................... 455/420; 345/581
(58) Field of Classification Search ................ 455/420; 345/581
See application file for complete search history.

(56) References Cited

U.S. PATENT DOCUMENTS 6,704,024 B2   3/2004   Robotham et al.

| 2001/0003823 | A1 | 6/2001 | Mighdoll et al. |
| 2003/0197725 | A1 | 10/2003 | Tuli |
| 2004/0177148 | A1 | 9/2004 | Tsimelzon, Jr. |
| 2008/0018658 | A1* | 1/2008 | Bruno et al. ................ 345/581 |

FOREIGN PATENT DOCUMENTS

WO   WO-01/63420 A1   8/2001
WO   WO-03/015330 A2   2/2003
WO   WO-2004/097645 A1   11/2004

OTHER PUBLICATIONS

Border et al.; "Performance Enhancing Proxies Intended to Mitigate Link-Related Degradations"; The Internet Society, 41 pages, (2001).

* cited by examiner

*Primary Examiner*—William D Cumming
(74) *Attorney, Agent, or Firm*—Finnegan, Henderson, Farabow, Garrett & Dunner, L.L.P.

(57) ABSTRACT

Methods and apparatuses for efficiently accessing and downloading web pages on high-latency communication networks are provided. After a user requests a web page, the web page is retrieved from a web server, image portions of the web page are separated from non-image portions, and an image-free web page comprising the non-image portions of the original web page is prepared such that the images of the original web page are replaced in the image-free web page by correspondingly sized and positioned placeholders. Additionally, an image including the non-image portions of the original web page is created such that the non-image portions are made transparent, and the original images are grouped into a single composite image while maintaining their positions and sizes. The image-free page and the image are then superimposed to form an optimised web page suitable for downloading to a user.

34 Claims, 5 Drawing Sheets

```
<html>
<head>
</head>

<body>
/* The whole of the HTML code of OriginalPage
is contained here */
</body>

</html>
```

Fig. 6A

```
<html>
<head>
</head>

<body>
/* The first part of the HTML code of
OptimisedPage is contained here */

<divname="GIFwithLinksBlock" style="z-index: 1;
position: absolute;">
/* The whole of the HTML code of GIFwithLinksBlock
is contained here */
</div>

<divname="FormBlock" style="z-index: 2; position:
absolute;">
/* The whole of the HTML code of FormBlock is
contained here */
</div>
</body>

</html>
```

Fig. 6B

METHOD OF OPTIMISING WEB PAGE ACCESS IN WIRELESS NETWORKS

CROSS REFERENCE TO RELATED APPLICATION

This application is a national phase application based on PCT/EP2004/014716, filed Dec. 24, 2004.

FIELD OF THE INVENTION

The present invention refers to wireless communication networks, and more particularly it concerns a method of optimising access to and speeding up download of web pages in said networks.

BACKGROUND OF THE INVENTION

Conventionally, domestic access to the Internet has taken place through the PSTN (Packet Switched Telephone Network), by using analogue modems. Such access is characterised by a rather limited latency between the page request and the page presentation on the user's equipment.

With such kind of access, download time of a web page depends, in a first approximation, only on the ratio between the page size (in bytes) and the channel throughput. Thus, most web pages currently available have been designed so as to ensure limited download times through a reduction of their overall sizes.

With the increasing use of wireless techniques, such as those conforming to GPRS (General Packet Radio Service), EDGE (Enhanced Data rates for GSM and IS-136 Evolution) and UMTS (Universal Mobile Telecommunication System) standards, for access to the Internet, the criterion of reducing the overall page sizes is no longer adequate, due to the very high latency time that characterises mobile wireless networks.

In a high latency network, the download time of a web page depends not only on the page size, but also on the number of objects referenced therein. In fact, a HTTP (Hyper Text Transfer Protocol) negotiation is necessary for downloading each object, and such negotiation needs a minimum time corresponding to the round trip time (RTT) of the network, which time is the sum of the network latencies in both directions.

Consequently, for a same nominal throughput of a PSTN and a wireless link (e.g. a GPRS link), access to and download of a web page through a GPRS link is much slower than through a PSTN modem.

A number of products, generally designed as Performance Enhancing Proxies (PEP), intended to decrease web page download time in high-latency networks, have become commercially available and are described in the literature. The general principles of the PEPs and of their application can be found in document RFC 3135 of The Internet Society, "Performance Enhancing Proxies Intended to Mitigate Link-Related Degradations", by J. Border et al., which document is available at the site http://www.ietf.org/rfc3135.txt.

Essentially, two classes of PEPs exist: client-server PEPs, demanding installation of a software on the client device, and client-free PEPs, which do not have such requirement.

An example of client-free PEP is disclosed in WO 03/15330 A, which teaches a parallelisation of a number of HTTP requests and, consequently, of the objects being downloaded. A data compression is further performed before forwarding the images to the user.

The client-server architectures are generally based on replacing the standard HTTP protocol by more performant protocols, and thus they are intrinsically more efficient.

Examples are disclosed in WO 01/63420 A, which teaches a system where use of predictive requests and a predictive server is made, or in US 2003/197725 A and U.S. Pat. No. 6,704,024 B, which disclose systems where web pages and other visual contents are rasterised and displayed on the client device as bitmap images.

US 2001/003823 A discloses a system, based on a client-server architecture, for downloading a web page in a manner suitable for display on a television screen. This document discloses a web page conversion aimed, inter alia, at reducing the latency time. To this end, such system separates the text and image portions of an original page by downloading first the text portion of the page with any image replaced by a corresponding placeholder; then the images are retrieved and downloaded, in order to fill the placeholders. Applicants remark that, due to the use of a client-server architecture, this system has the general drawbacks inherent in this type of architecture. Moreover, downloading the text and the images in subsequent phases reduces only the apparent time of the page download, since this procedure is based on the assumption that the latency is due to the time needed by the server to provide the images themselves. The actual latency time, related to the number of HTTP negotiations, is not however reduced by such systems, since the images are individually downloaded. Moreover displaying first the text only, and then the whole page with the images, can be uncomfortable for the user.

SUMMARY OF THE INVENTION

The Applicant has observed that the approach outlined by prior-art client-free Performance Enhancing Proxies find a limitation in the fact that known solutions are scarcely effective, as they are inherently limited by the HTTP protocols. Moreover, the degree of parallelisation of HTTP requests, cannot exceed certain limits, in order to avoid saturation of the available upstream bandwidth.

On the other hand, the Applicant observes that PEP systems based on client-server architectures have however the drawback that they need a specific client software, which is difficult to install and to maintain.

In view of the outlined state of the art and related problems, drawbacks and limitations, the Applicant has tackled the problem of how to provide a system which is implemented by a client-free proxying server (in short, "proxy"), which is able to reduce the download time of web pages and which displays at once the whole page to the user.

According to the invention, there is provided a method in which, after separation of the image and non-image portions of a requested original web page and replacement of the images by correspondingly sized and located placeholders, at least some of the non-animated images present in the original web page are combined into a single composite image, an optimised web page is created by superimposing the composite image onto an image-free web page comprising the non-image portions of the original web page and the placeholders, and said optimised page is downloaded to a requesting user.

The creation of the optimised page comprises the steps of:
building and temporarily storing the image-free web page;
building and temporarily storing an image page containing the composite image, with the component images located in their original positions, and a transparent area in place of the non-image portion;

building a first list with all links and buttons contained in the original web page, associating said first list with the composite image, and temporarily storing the first list associated with the composite image;

building and temporarily storing a second list with all forms contained in the original web page;

superimposing said first list associated with the composite image onto said image-free web page, and superimposing said second list onto the image-free web page having the first list associated with the composite image superimposed thereon.

Advantageously, the superimposition is obtained by means of a layering technique.

The invention also provides a computer program product loadable in the memory of at least one computer and comprising software code portions for performing the steps of the method of the invention when the product is run on a computer. As used herein, reference to such a computer program product is intended to be equivalent to reference to a computer-readable medium containing instructions for controlling a computer system to coordinate the performance of the method of the invention. Reference to "at least one" computer is obviously intended to highlight the possibility for the arrangement of the invention to be implemented in a decentralized fashion.

The invention provides also an apparatus for performing the method. The apparatus is essentially a client-free proxy, which can be configured either as an explicit proxy or as a user-transparent proxy.

Grouping several images of the original page into a single image significantly reduces the number of objects referenced in the page and hence the number of HTTP negotiations, and thus actually results in a significant reduction of the download time without need of employing special client software.

BRIEF DESCRIPTION OF THE DRAWINGS

Further objects, characteristics and advantages of the invention will become apparent from the following description of preferred embodiments, given by way of non-limiting example and illustrated in the accompanying drawings, in which:

FIGS. 6A, 6B are HTML codes of a standard page and of the corresponding optimised page.

DESCRIPTION OF THE PREFERRED EMBODIMENTS

Figure 1:
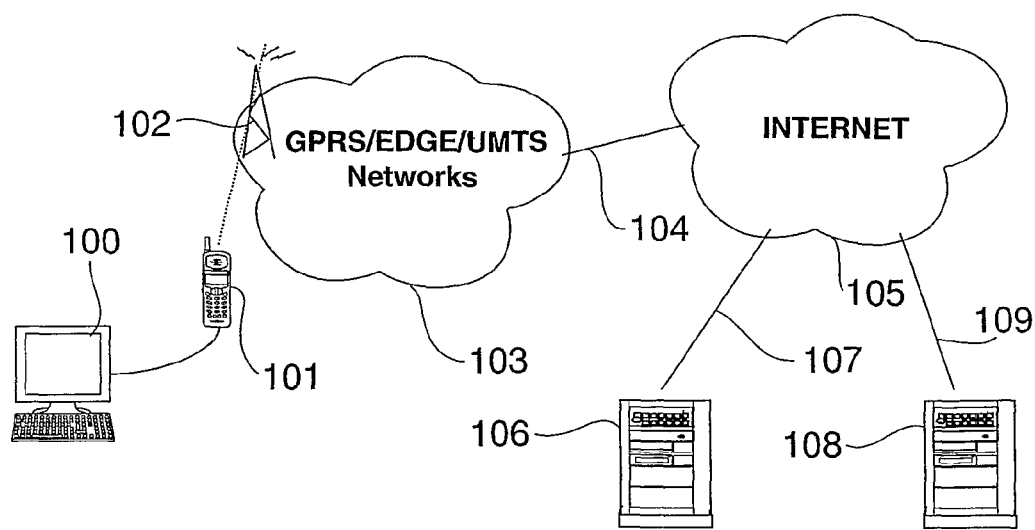
FIGS. 1 to 3 show three examples of architectures where the invention is applied.
Figure 2:
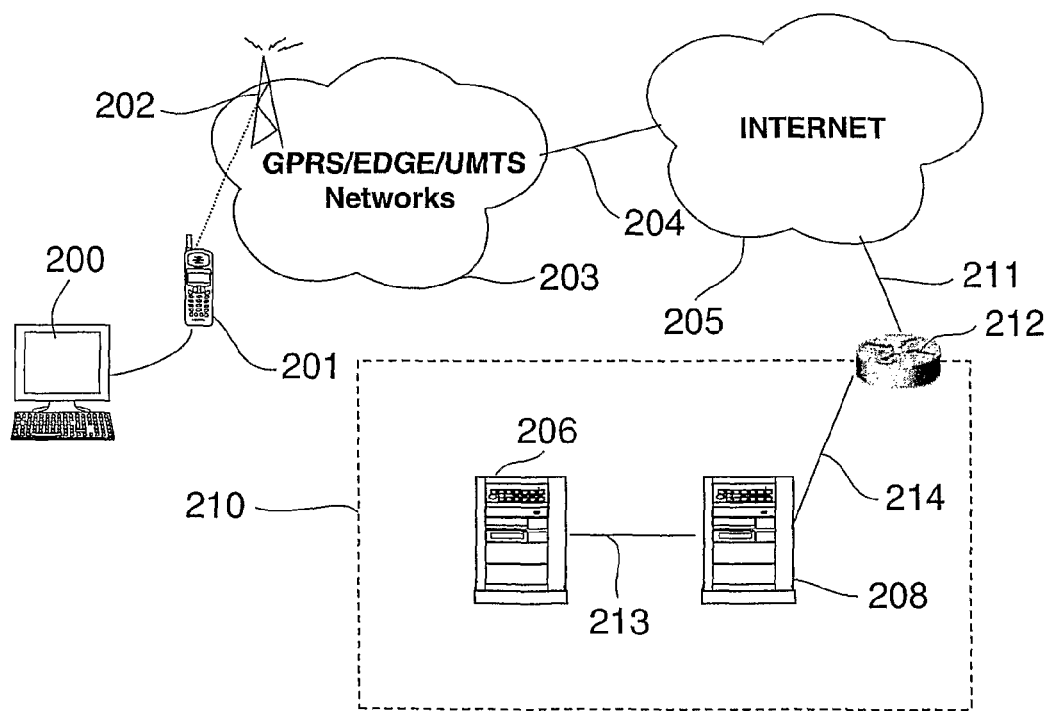
Figure 3:
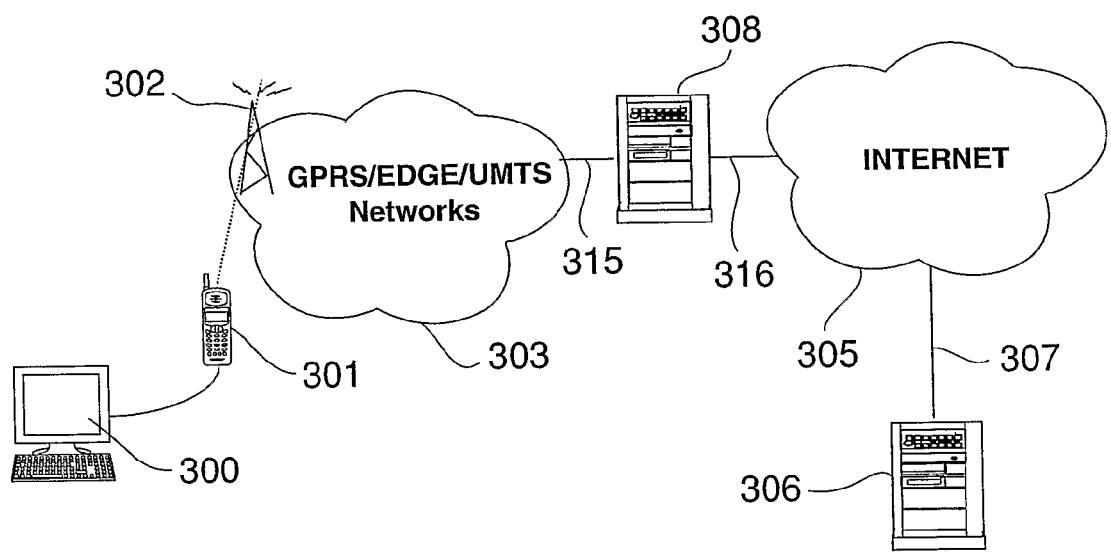

Three typical architectures in which the invention can be applied are disclosed with reference to FIGS. 1 to 3. In such Figures, like elements are denoted by like reference numerals, beginning with digit 1 or 2 or 3, respectively.

FIG. 1 shows the application of the invention to the optimisation of the web surfing by a user. In such a situation the invention is used to speed up the access to web pages present on any public web server connected to the Internet.

In this architecture, a computer 100 has access to a mobile wireless network (GPRS/EDGE/UMTS) 103 through a mobile terminal 101 communicating with a network base station, schematised by antenna 102.

Wireless network 103 is connected to the Internet 105 through a high-throughput link 104. Through wireless network 103 and the Internet 105 the users have access to all public servers hosting the contents downloadable by the users. The drawing shows by way of example a single web server 106, connected to the Internet 105 through a link 107.

A web page processing unit 108, implementing a page conversion according to the method of the invention, is also connected to the Internet 105 through a link 109.

Processing unit 108, referred to hereinafter as "page slicer", is essentially a client-free performance enhancement proxy exploiting the standard HTTP protocol. It attains a reduction in the latency time through a reduction of the number of images referenced in a page, and hence of the HTTP negotiations, obtained by grouping at least part of such images into a single, bigger image. Through such conversion, page slicer 108 builds and sends to the user an optimised page whose graphical aspect and functionality are the same as in the original page.

In this application page slicer 108 is to be configured as an explicit proxy, and the users are to insert the page slicer address into the web browser settings.

FIG. 2 shows the application of the invention to the optimisation of a web site. In such a situation the invention is used to speed up the access to web pages inside the network of a content provider, denoted by reference numeral 210.

As before, computer 200 has access to GPRS/EDGE/UMTS network 203 through a mobile terminal 201 communicating with a base station 202 of network 203, which is then connected to the Internet 205 through high-throughput link 204.

Content provider network 210 is connected to the Internet 205 through a high-throughput link 211 and an edge router 212. Web server 206 and page slicer 208 are located in content provider network 210 and are connected together by a link 213 with suitable throughput. Another link 214 with suitable throughput connects page slicer 208 to edge router 212.

In this architecture, page slicer 208 is transparent for the user, who therefore is not to set his/her browser so that the latter includes the page slicer address.

FIG. 3 shows the application of the invention to the optimisation of the navigation by the mobile network operator. Like in the architecture shown in FIG. 1, the invention is used to speed up the access to web pages on any public web server, like server 306, connected to the Internet. Yet, in this architecture, page slicer 308 is transparent for the user and all HTTP traffic of GPRS/EDGE/UMTS network 303 is redirected towards page slicer 308 by the control units in the wireless network. In this architecture, page slicer 308 is located between GPRS/EDGE/UMTS network 303 and the Internet 305, and is connected thereto by means of high-throughput links 315, 316, respectively.

The operations performed by page slicer 108 (or 208, 308) will now be described in detail with reference to FIGS. 4 and 5.

Figure 4:
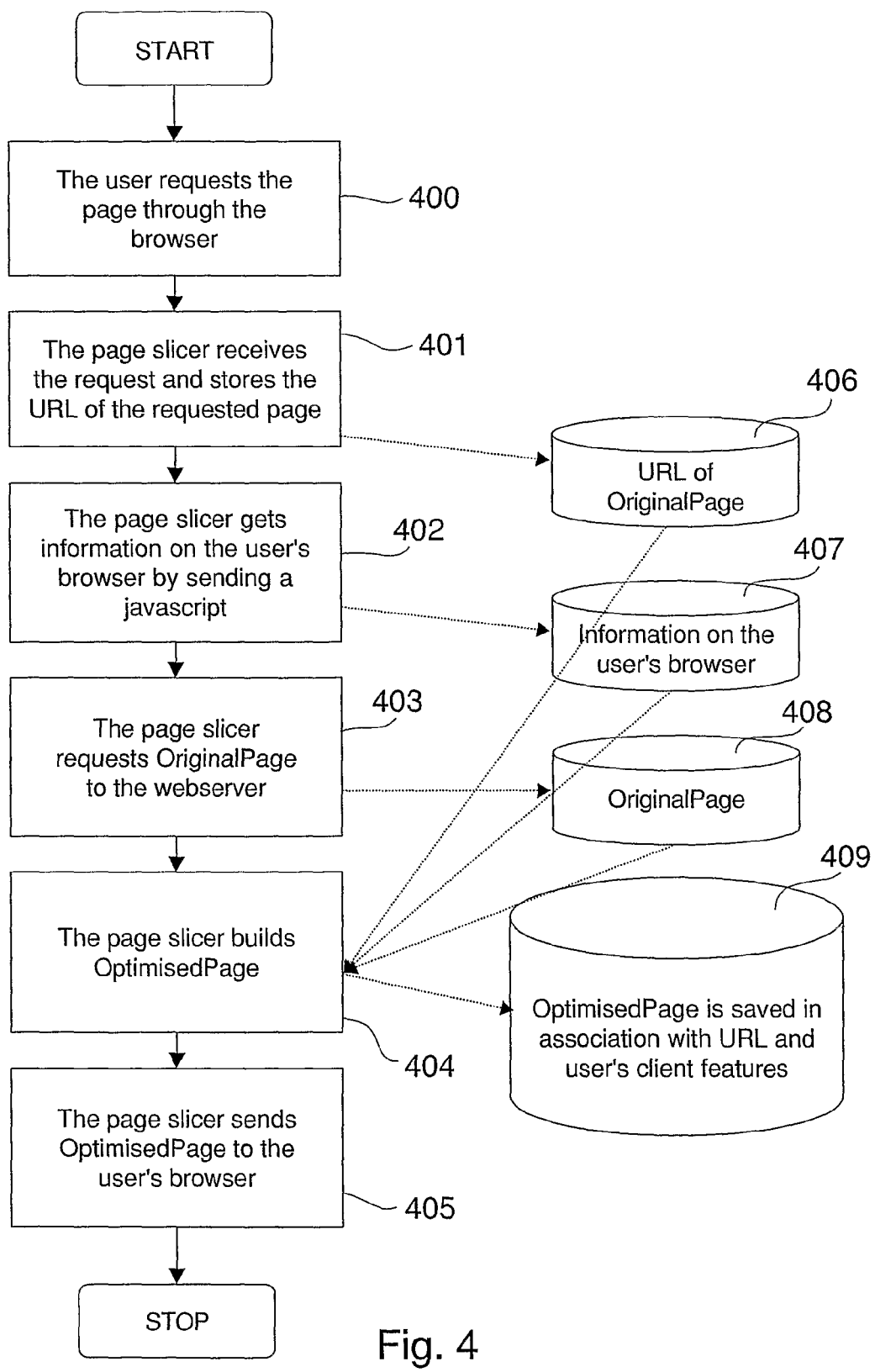
FIG. 4 is a general flow chart of the operation of the invention.

FIG. 4 is the general flow chart of the operation.

The first step after the start of the operation is the usual request by a user (computer 100, 200 or 300/mobile terminal 101, 201 or 301, depending on the architecture) of the web page of interest through its browser (step 400). The request arrives at page slicer 108 (208, 308), which stores the URL (Universal Resource Location) of the requested page (step 401) in a suitable memory area 406 for subsequent use.

Then page slicer 108 (208, 308) gathers and stores some information about the user's browser (steps 402, 407), i.e. it performs an identification of the client/browser pair.

Such identification is aimed at foreseeing how the original page would be rendered onto the browser, for the optimised page, which will be created according to the invention, to have exactly the same rendering. The manner in which the information about the user's browser is gathered will be discussed in detail below.

Then, at steps 403, page slicer 108 (208, 308) requests the original page (hereinafter and in the flow charts referred to as "OriginalPage") to server 106 (206, 306) and stores it in a suitable memory area 408. At step 404, the page slicer converts OriginalPage into an optimised web page (hereinafter "OptimisedPage"), which has a structure optimising access and download time through wireless network 103 (203, 303) and has the same appearance as the original page.

At step 405, page slicer 108 (208, 308) sends OptimisedPage to the user's browser, and at the same time it saves a copy thereof (as shown at 409) in a cache memory, in association with the URL and the browser characteristics, for use in case of subsequent requests.

The page slicer also implements a fallback mechanism for the case in which the client/browser pair is not recognised. In such case the conversion of step 404 is disabled to avoid supplying the user with a wrongly formatted page, and the user is supplied with the original page.

The client/browser identification also allows using the optimisation technique in connection with mobile terminals and PDAs (Personal Digital Assistants) equipped with non-standard HTML (Hyper Text Mark-up Language) browsers, which convert the format of a page according to proprietary modalities in order, for instance, to adapt the page to the display size. If the identification reveals that the browser is one such non-standard browser, and page slicer 108 (208, 308) has the information about such browser, the page will be transformed correspondingly. Otherwise, the fallback mechanism provides for sending the original page to the user.

Turning back to the acquisition of information on the browser, the most important information items are the following ones:
- type of device being used (e.g. personal computer, PDA, Smart Phone . . . );
- type, release and language of the operating system;
- type, release and language of the browser;
- resolution and colour depth of the display;
- size of the viewport of the display.

To get such information, after the browser has requested OriginalPage and the page slicer 108 (208, 308) has stored the URL thereof, the page slicer sends to the browser a page containing a particular piece of JavaScrip™ code collecting all of the information requested and inserts the above URL into said page, through a proper JavaScrip™ variable.

Subsequently, the JavaScrip™ code, after having read and stored the parameters requested, makes the browser request again OriginalPage, and the parameters are passed to the page slicer appending them to the URL of OriginalPage according to the conventional technique of the variable-value pairs.

Then, when a URL relevant to a request, with the appended parameters, arrives at the page slicer, the latter gets OriginalPage from the server, converts the page depending on the parameters and sends the converted page back to the browser.

Figure 5:
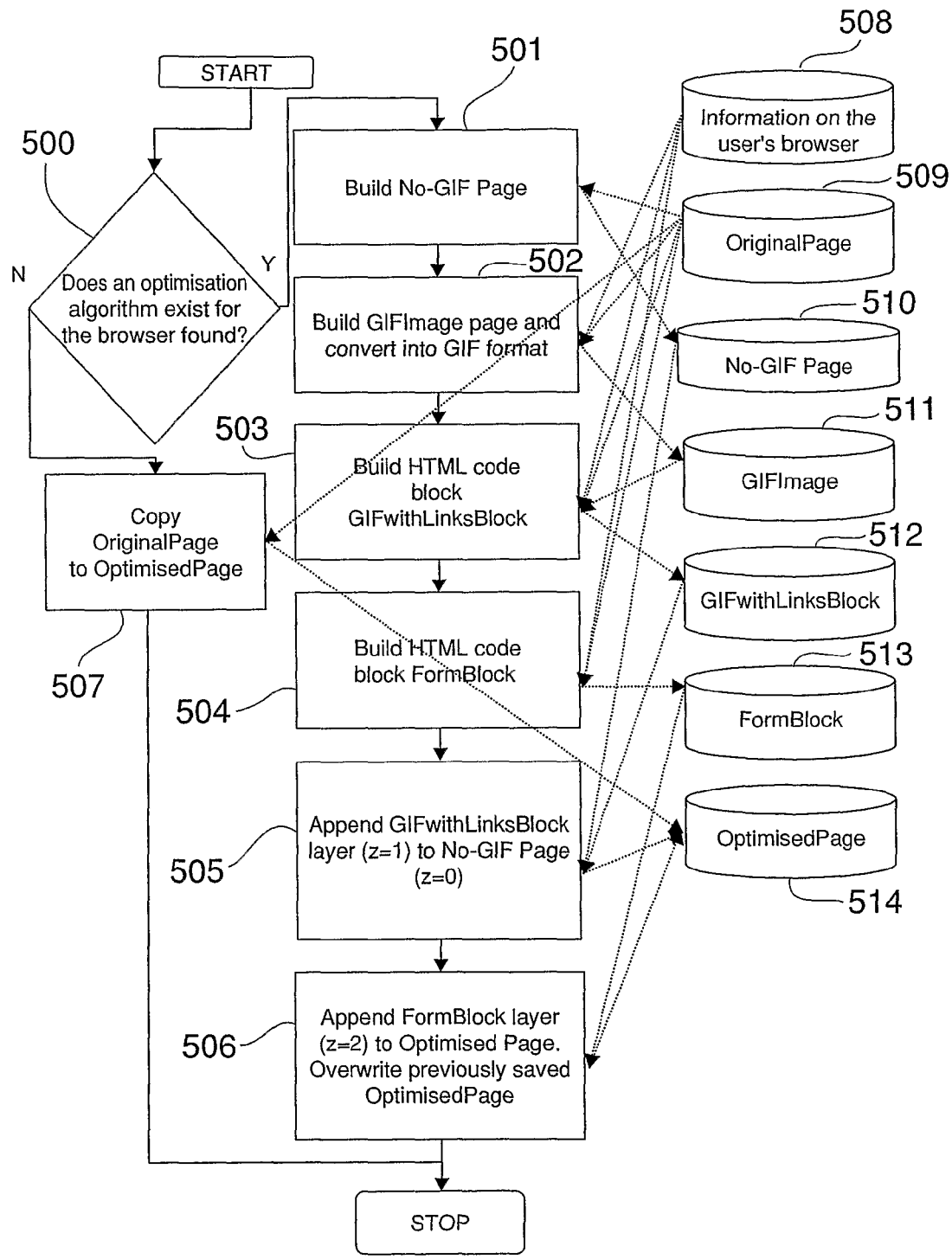
FIG. 5 is a flow chart of the preparation of an optimised page.

Turning now to FIG. 5, OptimisedPage is built from OriginalPage, by using the information gathered about the client/browser pair, so as to join all non-animated images contained in a page into a single composite image. In the described embodiment, GIF (Graphical Interface Format) image format has been used, although other image formats are possible. Animated images are not processed and are still to be individually requested.

The first step 500 is a check about the existence of an optimisation algorithm for the particular browser.

If that algorithm does not exist, this means that the client/browser pair has not been identified and the fallback mechanism is implemented: OriginalPage is copied into OptimisedPage (step 507) and is downloaded to the user. The caching is performed also in this case, as shown at 514.

If the algorithm exists, page slicer 108 (208, 308) downloads the HTML code of OriginalPage from web server 106 (206, 306), performs a parsing of the code to identify all non-animated GIF images referenced therein and replaces all references by a reference to a same transparent GIF image of 1×1 pixel (steps 501, 509). Replacement of each image is performed by maintaining the same size as the original image. If that size is not contained in the HTML code, the physical size of the image is determined and inserted into the HTML code. In this way, the graphical proportions of the page are maintained, and a transparent area or blank (placeholder) of the same size as each image is left on the page. The page so built will be referred to as "No-GIF page". The No-GIF page is stored in a temporary storage area 510, in the page slicer memory or on a disk.

At step 502, the page slicer performs the memory rendering of OriginalPage (read from memory area 509), by taking into account the client/browser pair characteristics previously gathered. Such characteristics are read from storage area 508. The page slicer eliminates all elements except the non-animated images from the page, by making such elements transparent. The result of step 502 is a single image having the same size as the browser viewport and containing only the GIF images of OriginalPage in their proper positions, whereas the remaining page portion (i.e. the text, Macromedia Flash™ content, etc.) is transparent. This image will be referred to as "GIFImage". At the same time, the page slicer converts GIFImage into GIF format, thereby creating a suitable optimised palette that is saved, as shown at 511.

Should JPEG (Joint Picture Experts Group) or PNG (Portable Network Graphics) images be contained in the page, they will be converted into GIF format so that the transparent placeholders can be built.

At step 503, a list of all links and buttons contained in OriginalPage is built, said list including the target URL and the physical position of each said link and button. Such list is associated with GIFImage in an imagemap, and an HTML code block containing said imagemap is built. This block, referred to as "GIFwithLinksBlock", is also stored in a temporary storage area in the page slicer memory or on a disk, as shown at 512.

Then, at step 504, the page slicer builds a list of all forms present in OriginalPage, together with their physical positions on the page. A further HTML code block, the "FormBlock", is built containing all said forms. FormBlock is stored in a temporary storage area in the page slicer memory or on a disk, as shown at 513.

Then the optimised page is built by the following sequence of operations.

1. OptimisedPage is initialised by creating a copy of No-GIF page; this copy forms a base layer having a co-ordinate Z=0;
2. a layer, delimited by tags <DIV> as requested by the HTML rules and positioned with absolute co-ordinates, is appended to this initial OptimisedPage and HTML code block "GIFwithLinksBlock" is inserted into said layer; the layer is associated with co-ordinate Z=1 (that is, the co-ordinate of No-GIF page increased by 1), so that the layer is superimposed to the No-GIF page (step 505); the page so built is saved in storage area 514.

3. a further layer, also delimited by tags <DIV> and positioned with absolute coordinates, is appended to the OptimisedPage obtained by the previous step, and HTML code block "FormBlock" is inserted into said layer; the layer is associated with a co-ordinate Z=2, so that the layer is superimposed to the previous layers (step 506). The page so built is saved at 514.

OptimisedPage is thus ready for being forwarded to the browser and displayed to the user.

An example of HTML code of OptimisedPage is shown in FIG. 6B. The different layers mentioned above are clearly apparent in the body of the HTML code.

Thanks to the way in which it has been built, OptimisedPage is aesthetically and functionally identical to OriginalPage, even if it has a different HTML code (compare FIGS. 6A, 6B).

OptimisedPage contains a lower number of objects, as all GIF images have been combined into and replaced by a single composite image. Moreover, since most of the objects referenced inside web pages are typically GIF images, the reduction of the objects present in a page to be downloaded is actually significant. Since, as said above, the download time in high latency networks is strongly dependent on said number, a significant reduction of the download time of the converted page is achieved. The reduction of the objects present in a page entails a corresponding reduction of the traffic due to HTTP negotiations and thus a more advantageous exploitation of the network resources is also obtained. Moreover, building of the optimised page is independent of the browser installed on the user equipment.

Note also that, as clearly apparent from the flow charts of FIGS. 4 and 5, a caching mechanism has been introduced to save the already optimised pages. In this manner, when a page already processed in the past is requested again, such page can be simply read from the cache without need of reprocessing it. This is important in view of the fact that the method is computationally complex.

The reduction of the download time can further be enhanced through a compression of the text (HTML codes, JavaScrip™, CSS (Cascading Style Sheet) . . . ) which is to be effected by the standard compression methods for the browser to be able to automatically perform decompression.

Similarly, also GIFImage could be compressed to reduce its size: for instance, it is possible to reduce the number of colours, or to reduce the amount of details while keeping unchanged the resolution.

It is evident that the above description has been given by way of non-limiting example and that changes and modifications are possible without departing from the scope of the invention.

For instance, even if the invention has been disclosed with particular reference to mobile communication networks, it can be applied also for optimising access through satellite links, which have features comparable to those of mobile communications links.

Moreover, even if it has been assumed hereinbefore that all GIF images in a page are joined into a single image, an alternative solution could be joining groups of GIF images physically close or adjacent to one another, thereby forming a number of composite images. The composite images can then be inserted in a layer in place of the original ones, like the single image discussed above. This alternative solution entails a smaller reduction in the download time, but it reduces implementation complexity.

Should the original page already comprise multiple layers, another alternative solution could be joining the images separately for each layer. In such situation, the caching mechanism could be performed at the layer level and thus could be more effectively exploited in case different layers have different expiry times: upon request by the browser of layers containing objects already downloaded and having an expiry time not yet elapsed, the optimised layer can be read from the cache, without need of processing again the whole page.

The invention claimed is:

1. A method of optimising web page access and download in wireless communication networks, comprising processing of a requested original web page in order to separate image and non-image portions of said original web page and to replace the images by correspondingly sized and located placeholders, said processing being performed in a proxying server independent of the user, comprising the steps of:
   combining at least some of the images present in said original web page into a single composite image;
   creating an optimised web page by superimposing the composite image onto an image-free web page comprising the non-image portion of the original web page and the placeholders; and
   downloading said optimised page to a requesting user.

2. The method as claimed in claim 1, further comprising, before the creating of the optimised web page, the steps of:
   storing, upon reception of a user's request for a web page, a universal resource location of the requested web page; and
   gathering and storing information about the user's browser.

3. The method as claimed in claim 2, further comprising the step of saving the optimised web page in association with said universal resource location of the requested web page and the information about the user's browser.

4. The method as claimed in claim 2, wherein said step of gathering information on the user's browser comprises sending a page containing a piece of JavaScript™ code by said proxying server to said browser.

5. The method as claimed in claim 1, wherein said creating of the optimised web page comprises the steps of:
   building and temporarily storing said image-free web page;
   building and temporarily storing an image page containing said composite image, with said at least some images located in their original positions, and transparent areas in place of the non-image portions of the original web page;
   building a first list with all links and buttons contained in the original web page, associating said first list with the composite image, and temporarily storing the first list associated with the composite image;
   building and temporarily storing a second list with all forms contained in the original web page; and
   superimposing said first list associated with the composite image onto said image-free page, and superimposing said second list onto the image-free web page having the first list associated with the composite image superimposed thereon.

6. The method as claimed in claim 5, further comprising performing a preliminary check on the availability of an optimisation algorithm suitable for the user's browser, and wherein the optimised web page is created through said building and superimposing steps if such an algorithm is available, and is created by copying the original web page in case such algorithm is not available.

7. The method as claimed in claim 5, wherein said image page is converted into a graphical interface format.

8. The method as claimed in claim 5, wherein any non-animated image in a format other than a graphical interface format is converted into the graphical interface format for the replacement by placeholders and the combining into said composite image.

9. The method as claimed in claim 5, wherein said original web page comprises a hyper text mark-up language code, and said step of building an image-free web page comprises:
parsing said code to identify all non-animated graphical interface format images referenced therein;
replacing the references to said images by a reference to a same transparent graphical interface format image with 1×1 pixel size.

10. The method as claimed in claim 9, wherein said step of associating said first list with the composite image comprises building a first hyper text mark-up language code block containing an imagemap providing for said association.

11. The method as claimed in claim 10, wherein said step of building said second list comprises building a second hyper text mark-up language code block containing said list.

12. The method as claimed in claim 11, wherein said steps of superimposing comprise:
building, with hyper text mark-up language data of the image-free web page, a first layer having a first value of a co-ordinate Z;
appending said first hyper text mark-up language code block at the end of the hyper text mark-up language data of the image-free web page, as a second layer having a co-ordinate Z increased by 1 with respect to said first value; and
appending said second hyper text mark-up language code block at the end of said first hyper text mark-up language code block as a second layer having a co-ordinate Z increased by 2 with respect to said first value.

13. The method as claimed in claim 1, wherein said composite image is compressed before being introduced into said optimised page.

14. The method as claimed in claim 1, wherein all graphical interface format images in an original web page are combined into a single composite image.

15. The method as claimed in claim 1, wherein multiple groups of graphical interface format images in an original web page are combined into respective composite images, and said composite images are superimposed onto corresponding placeholders.

16. The method as claimed in claim 15, wherein each group comprises closely spaced or adjacent images.

17. The method as claimed in claim 15, wherein the original web page is organised in layers, and each group comprises images of a layer.

18. The method as claimed in claim 1, wherein said wireless communication networks are mobile communication networks exhibiting a high latency between a web page request and a page presentation on user equipment.

19. The method as claimed in claim 1, wherein said wireless communication networks are satellite communication networks exhibiting a high latency between a web page request and a page presentation on user equipment.

20. An apparatus for optimising web page access and download in wireless communication networks comprising a processing unit for:
receiving a web page request from user equipment,
downloading an original web page from a server hosting the original web page, and
processing the web page so as to separate image and non-image portions of the web page and replace images of the image portions by correspondingly sized and located placeholders,
wherein the processing unit:
acts as a performance enhancement proxying server independent of the user equipment,
converts the original web page into an optimised web page in which at least part of the images of the original web page are grouped into a single composite image, and the composite image is superimposed on an image-free web page comprising the non-image portions of the original web page and the placeholders, and
downloads the optimised web page to the user equipment.

21. The apparatus as claimed in claim 20, wherein said processing unit additionally functions as an explicit proxying server whose address is to be included into the settings of a user's browser.

22. The apparatus as claimed in claim 20, wherein said processing unit additionally functions as a transparent proxying server within a network of a content provider.

23. The apparatus as claimed in claim 20, wherein said processing unit additionally functions as a transparent proxying server toward which all internet-related traffic of said wireless communication networks are redirected.

24. The apparatus as claimed in claim 20, further comprising first memory units storing a universal resource location of the original web page, information about equipment of a requesting user, the original web page and the optimised page associated with said universal resource location of the original page, and information about the user's equipment.

25. The apparatus as claimed in claim 20, further comprising second memory units temporarily storing:
said image-free web page;
an image page, containing said composite image with said at least some images located in their original positions and transparent areas in place of the non-image portions of the original web page and having associated therewith a first list with all links and buttons contained in the original web page; and
a second list with all forms contained in the original web page.

26. The apparatus as claimed in claim 25,
wherein said second memory units store hyper text mark-up language code blocks representative of said image-free web page, of said image page associated with the first list, and of said second list by associating said code blocks with increasing consecutive values of a co-ordinate Z, and
wherein said processing unit is arranged to insert said code blocks into successive layers of said optimised web page, wherein the code block representative of said image-free web page forms a bottom layer and the code block representative of said second list forms a top layer.

27. The apparatus as claimed in claim 20, wherein said wireless communication networks are mobile communication networks.

28. The apparatus as claimed in claim 20, wherein said wireless communication networks are satellite communication networks.

29. A communication network for accelerating access to web pages present on web servers connected to the interne, the communication network comprising at least one web page processing unit for:
receiving a web page request from user equipment,
downloading an original web page from a server hosting the original web page, and processing the web page so as to separate image and non-image portions of the web page and replace images of the image portions by correspondingly sized and located placeholders, wherein the processing unit:

acts as a performance enhancing proxying server independent of the user equipment, converts the original web page into an optimised web page in which at least part of the images of the original web page are grouped into a single composite image, and the composite image is superimposed on an image-free web page comprising the non-image portions of the original web page and the placeholders, and downloads the optimised web page to the user equipment.

30. A non-transitory computer-readable medium containing a set of instructions that cause a computer to perform a method of optimising web page access and download in a wireless communications network, the method comprising:

processing a requested original web page to separate image and non-image portions and replace the image portions by correspondingly sized and located placeholders;

combining at least some of the images present in the original web page into a single composite image;

creating an optimised web page by superimposing the composite image onto an image-free web page comprising the non-image portions of the original web page and the placeholders; and downloading the optimised web page to a requesting user.

31. A system for optimising web page access and download in wireless communication networks by processing an original web page requested by user equipment, the system comprising a processing unit for:

providing a link to a performance enhancing proxying server independent of the user equipment for performing the processing of the original web page;

causing the performance enhancing proxying server to:

separate image and non-image portions of the original web page and to replace the images of the image portion by correspondingly sized and located placeholders, and convert the original web page into an optimised web page in which at least part of the images in the original web page are grouped into a single composite image, and the composite image is superimposed on an image-free web page comprising the non-image portions of the original web page and the placeholders; and causing the optimised web page to be downloaded to the user equipment.

32. The system as claimed in claim 31, wherein the performance enhancing proxying server is configured as an explicit proxying server whose address is to be included into the settings of a user's browser.

33. The system as claimed in claim 31, wherein the performance enhancing proxying server is configured as a transparent proxying server within a network of a content provider.

34. The system as claimed in claim 31, wherein the performance enhancing proxying server is configured as a transparent proxying server toward which all internet-related traffic of the wireless communication networks are redirected.

* * * * *